(12) United States Patent
Abiri

(10) Patent No.: US 9,020,434 B2
(45) Date of Patent: Apr. 28, 2015

(54) WIFI DIRECT SETUP USING OUT OF BAND SIGNALING

(71) Applicant: Intel Corporation, Santa Clara, CA (US)

(72) Inventor: Roni Abiri, Raanana (IL)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 13/660,237

(22) Filed: Oct. 25, 2012

(65) Prior Publication Data

US 2014/0120837 A1 May 1, 2014

(51) Int. Cl.
*H04B 7/00* (2006.01)
*H04B 1/00* (2006.01)
*H04B 15/00* (2006.01)
*H04W 28/02* (2009.01)

(52) U.S. Cl.
CPC ..................................... *H04W 28/02* (2013.01)

(58) Field of Classification Search
USPC ............... 455/500, 509, 517, 63.1, 63.3, 501, 455/41.2; 370/329
See application file for complete search history.

(56) References Cited

U.S. PATENT DOCUMENTS

| 2009/0111378 | A1 | 4/2009 | Sheynman et al. | |
|---|---|---|---|---|
| 2010/0093364 | A1 | 4/2010 | Ribeiro et al. | |
| 2011/0252146 | A1 | 10/2011 | Santamaria et al. | |
| 2011/0275316 | A1 | 11/2011 | Suumaki et al. | |
| 2012/0014334 | A1* | 1/2012 | Oh et al. | 370/329 |
| 2012/0015607 | A1 | 1/2012 | Koskela et al. | |
| 2012/0044815 | A1* | 2/2012 | Geirhofer et al. | 370/248 |
| 2014/0146727 | A1* | 5/2014 | Segev et al. | 370/311 |

OTHER PUBLICATIONS

"International Application Serial No. PCT/US2013/045596, International Search Report mailed Oct. 21, 2013", 3 pgs.
"International Application Serial No. PCT/US2013/045596, Written Opinion mailed Oct. 21, 2013", 6 pgs.
"Part 11: Wireless LAN Medium Access Control (MAC) and Physical Layer (PHY) Specifications", IEEE Std 802.11. Local and metropolitan area networks. IEEE Standards Association. IEEE Computer Society., (Mar. 29, 2012), 2973 pgs.

* cited by examiner

*Primary Examiner* — Nguyen Vo
(74) *Attorney, Agent, or Firm* — Schwegman Lundberg & Woessner, P.A.; Gregory J. Gorrie

(57) ABSTRACT

Disclosed in some examples is a method including receiving at a coordinator node a plurality of operational reports from a plurality of devices, each device engaging in a WiFi Direct communication session, the operational reports identifying a first communication parameter used for the WiFi Direct wireless communication session and a second communication parameter observed of a neighboring communication session; calculating one or more optimal communication parameters for one or more of the plurality of devices using the first and second communication parameters from the plurality of operational reports; and sending to the one or more of the plurality of devices the calculated one or more optimal communication parameters, wherein the plurality of operational reports are received and the optimal communication parameters are sent over a network out-of-band from the WiFi Direct communication sessions.

37 Claims, 5 Drawing Sheets

WIFI DIRECT SETUP USING OUT OF BAND SIGNALING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright INTEL, All Rights Reserved.

BACKGROUND

Wireless Fidelity (WiFi) Direct systems allow for devices that communicate according to an Institute for Electrical and Electronics Engineers (IEEE) 802.11 family of standards to communicate directly with each other without the need for a central access point. Devices employing WiFi Direct can "find" each other using device and service discovery and establish a secure peer-to-peer wireless connection to these devices without the need for the traditional access point. Typically each device that supports WiFi Direct includes a software access point ("Soft AP"). This Soft AP effectively turns a particular device into an access point to which one or more other devices can connect.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
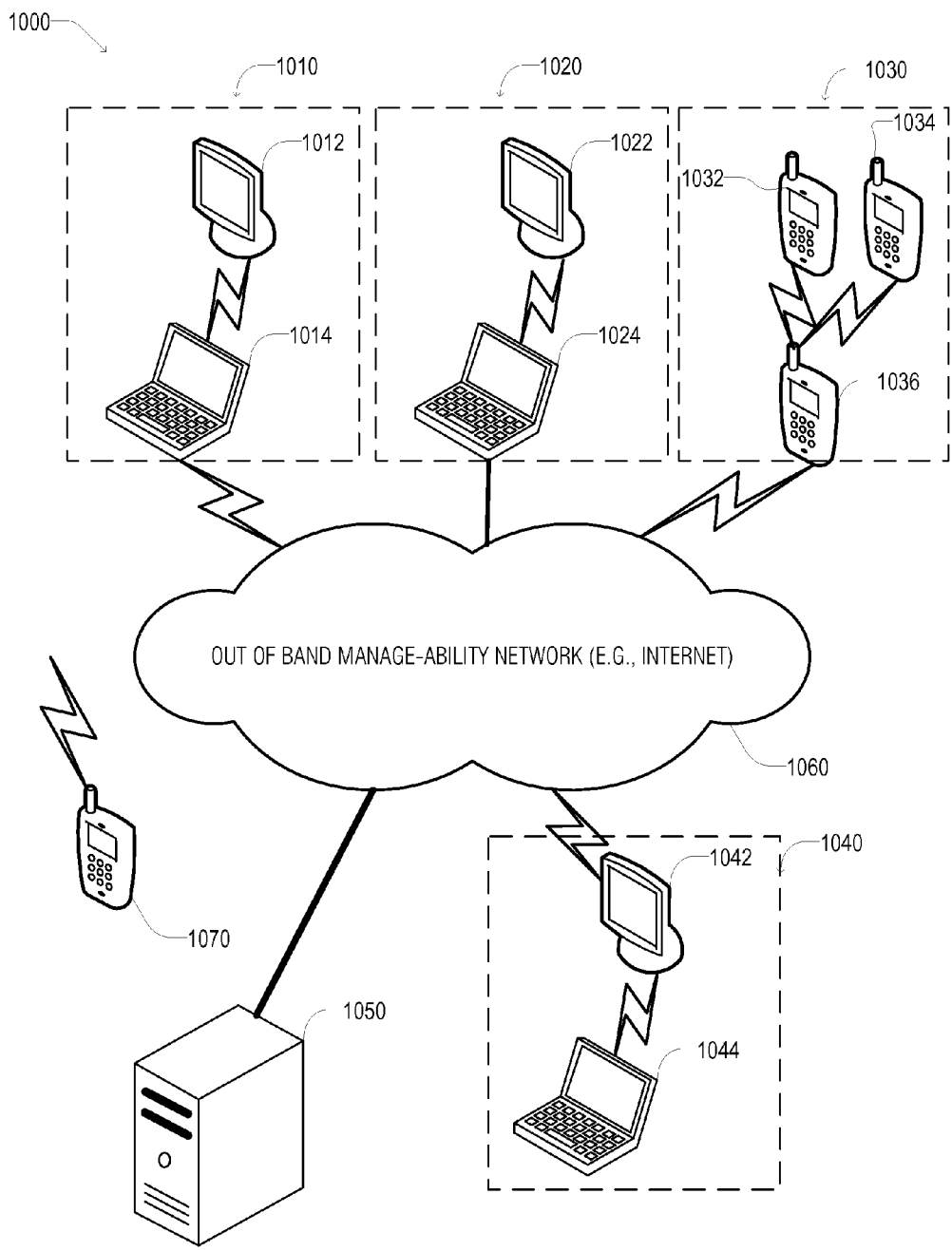
FIG. 1 shows a schematic of a system according to some examples of the present disclosure.

Since WiFi Direct uses unlicensed spectrum, it is subject to collisions and interference from other devices that use similar frequencies. As the usage of WiFi Direct increases, so too will the possibility of interference between different WiFi Direct communications sessions. For example, if multiple laptops/notebooks or any other computing devices are communicating with multiple respective docking stations via Wi-Fi Direct it is possible that the docking station/notebook pairs may interfere with each other. This is because the frequency and other parameters used for the WiFi Direct communications are not coordinated between each communication session. While the devices may scan for free frequencies to use prior to, or as part of, establishing their communication session, this is not a guarantee that this frequency is actually free or that the frequency will remain free in the future. While WiFi devices utilize collision avoidance through Carrier Sensing Multiple Access/Collision Avoidance (CSMA/CA), that mechanism provides only a partial solution as it is not able to guarantee a particular level of Quality of Service (QoS) that may be required for certain WiFi Direct applications (e.g., a WiFi Direct docking station).

Disclosed in some examples are systems, methods, and machine-readable media which utilize out-of-band signaling to coordinate frequency and other operational parameters among a plurality of previously uncoordinated wireless communication sessions (e.g., WiFi Direct communication sessions). The term communication session may describe one or more devices which are engaged in ongoing communications. For example, a WiFi Direct device running a Soft AP and all devices which have associated with that access point may be a WiFi Direct communication session. A WiFi association procedure enables the Soft AP to allocate resources and synchronize with a particular device. While the examples presented herein are described in the context of WiFi Direct devices and communication sessions, one skilled in the art with the benefit of Applicant's disclosure will appreciate that other previously uncoordinated wireless communications sessions (e.g., Bluetooth) may benefit from the systems, methods, and machine-readable media herein disclosed.

The out-of-band coordination may occur on another WiFi network (e.g., a traditional access point-based network), a different wireless network (e.g, cellular), a wired network (e.g., Ethernet), or any other network that is independent of the various WiFi Direct communication sessions.

In some examples, this out-of-band coordination may be coordinated by a coordinator node. Participating WiFi Direct devices may generate reports identifying their operational parameters and/or the operating parameters they observe regarding neighboring WiFi Direct communication sessions, neighboring regular WiFi connections, and/or other neighboring communication sessions (regardless of protocol) which operate in frequency bands close enough to pose interference issues to the device. These reports may be sent to the coordinator node through the out-of-band network. The coordinator node may then use these reports to determine the optimal configuration for all the participating devices. The participating devices are then notified of the calculated optimal operating parameters over the out-of-band network. The devices may then reconfigure themselves optimally based on the calculated optimal operating parameters sent from the coordinator node to the devices over the out-of-band network. The set of participating WiFi Direct devices managed by a particular coordinator node may be called a WiFi Direct group.

In some examples only the WiFi Direct devices serving as the Soft AP need to send the reports and receive the configuration information as the Soft AP may control the operational parameters and may signal any associated devices that the operational parameters may change. In other examples, the associated WiFi Direct devices may also have out-of-band connections and may also send reports and/or receive operational parameters to and from the coordinator node themselves. In yet other examples, the associated WiFi Direct devices may scan the air interface and send reports to the Soft AP who may then forward those reports to the coordinator node over the out-of-band network.

The coordinator node in some examples may be a server, an access point, another WiFi Direct device (such as a WiFi Direct device serving as a Soft AP), or the like. In examples in which the coordinator node is another WiFi Direct device, the coordinator node may be elected as the coordinator node for a particular area by the other devices. This election may be made based on an evaluation of one or more selection criteria. Example selection criteria include the number of devices that a particular node directly "sees," a node's willingness to be a coordinator node (e.g., some devices may not have the processing resources necessary and may wish not to be a coordinator node), the node's location permanence, or the like. Using the node's location permanence as a factor in determining which node is the coordinator node may help to ensure stability of the coordinator node, thereby preventing frequent election procedures.

The various WiFi Direct devices may discover the coordinator node in a variety of ways. For example, the coordinator node may broadcast its presence over a WiFi network (e.g., if the coordinator node is an Access Point it may broadcast its presence to all devices within range of its signal), the out of band network, another network, or the like. In other examples, devices may send a discovery request across the out-of-band network, the WiFi network, or the like, to which the coordinator node may reply.

The group of WiFi Direct devices managed by the coordinator node may consist of those devices who wish to participate and those devices capable of communicating with and/or discovering the identity of the coordinator node. For example, if the coordinator node is a WiFi access point, those devices wishing to participate and in range of the WiFi access point may be in the WiFi Direct group. In other examples, those devices wishing to participate and in a particular network subdivision (e.g., in the same subnet, Local Area Network, Wide Area Network, Cell Network, or the like) may be in the WiFi Direct group. In other examples, if the coordinator node broadcasts a message to advertise its coordination services, any WiFi Direct device which receives the broadcast message may chose to join the group.

The coordinator node may receive operational information regarding the device's neighbors and the node itself from each device in the network. This operation information may include the operating frequency, the transmit power, Multiple Input, Multiple Output (MIMO) configurations, or the like. In some examples, the coordinator node may build an interference matrix between the known communication sessions, where organ $R_{i,j}$ refers to the probability of communication session i to be interfered by communication session j. The matrix may not be symmetrical, so $R_{i,j} \neq R_{j,i}$. In addition the throughput data of each communication session may be aggregated, and used later for estimating the probability of collision. The throughput may be used when looking at the overall impact of interference or collision, as the system may weigh in the overall traffic as the higher the traffic level for either the aggressor or the impacted device, the higher the probability of collisions and thus the higher impact on performance. Once this matrix is computed, an Automatic Frequency Planning algorithm may calculate the optimal frequencies of the participating communication sessions based on the interference matrix to find optimal operating parameters for the participating communication sessions. This process may be repeated as new logged data becomes available.

Turning now to FIG. 1, an example system 1000 with example communication sessions 1010, 1020, 1030, and 1040 are shown. Communication session 1010 includes a docking station with a display 1012 communicating over WiFi Direct with a notebook 1014. The notebook 1014 is also wirelessly connected to an out-of-band network 1060 (manage-ability network). Out-of-band manageability network 1060 may be any network capable of connecting devices to the coordination node 1050 that is not the WiFi Direct networks used in the communication sessions. Example out of band manageability networks may be or include parts of local area networks (LAN), a wide area networks (WAN), the Internet, a cellular network, a Bluetooth network, an ad-hoc network, or the like. Devices may access this network in many ways, including another wireless link (as shown in communication sessions 1010, 1030, and 1040), a wired link (as shown in communication session 1020) or the like. Communication session 1020 shows a docking station 1022 communicating over WiFi Direct with a notebook 1024. The notebook 1024 has a wired connection to the manageability network 1060. Communication session 1030 includes mobile phones 1032, 1034, and 1036 and a wireless link to the manageability network. Wireless links may include cellular data connections over networks such as a Long Term Evolution (LTE) wireless network, a Universal Mobile Telecommunications (UMTS) network, a Bluetooth network, a Wi-Fi network (which is not the networks used for the WiFi Direct communications sessions) or the like. Communication session 1040 has a notebook 1044 and a docking station 1042 with a wireless link to the manageability network 1060. Mobile device 1070 is communicating with an unknown device (not shown) and is not participating in the WiFi Direct management group, and thus its operating parameters cannot be controlled, however, interference to, and interference from this device can still be minimized by the coordinator node 1050, as other communication sessions may report information on observed operational parameters of mobile device 1070.

Coordinator node 1050 is shown in FIG. 1 as a server, but in other examples it could be a WiFi Direct node participating in a WiFi direct communication session. In other examples, the coordinator node 1050 may be a WiFi Access point providing access to other nodes (in some examples, providing the manageability network 1060). While coordinator node 1050 is shown in FIG. 1 as being connected to the manageability network 1060 by a wired connection, in other examples the coordinator node 1050 may be connected via a wireless link.

Figure 2:
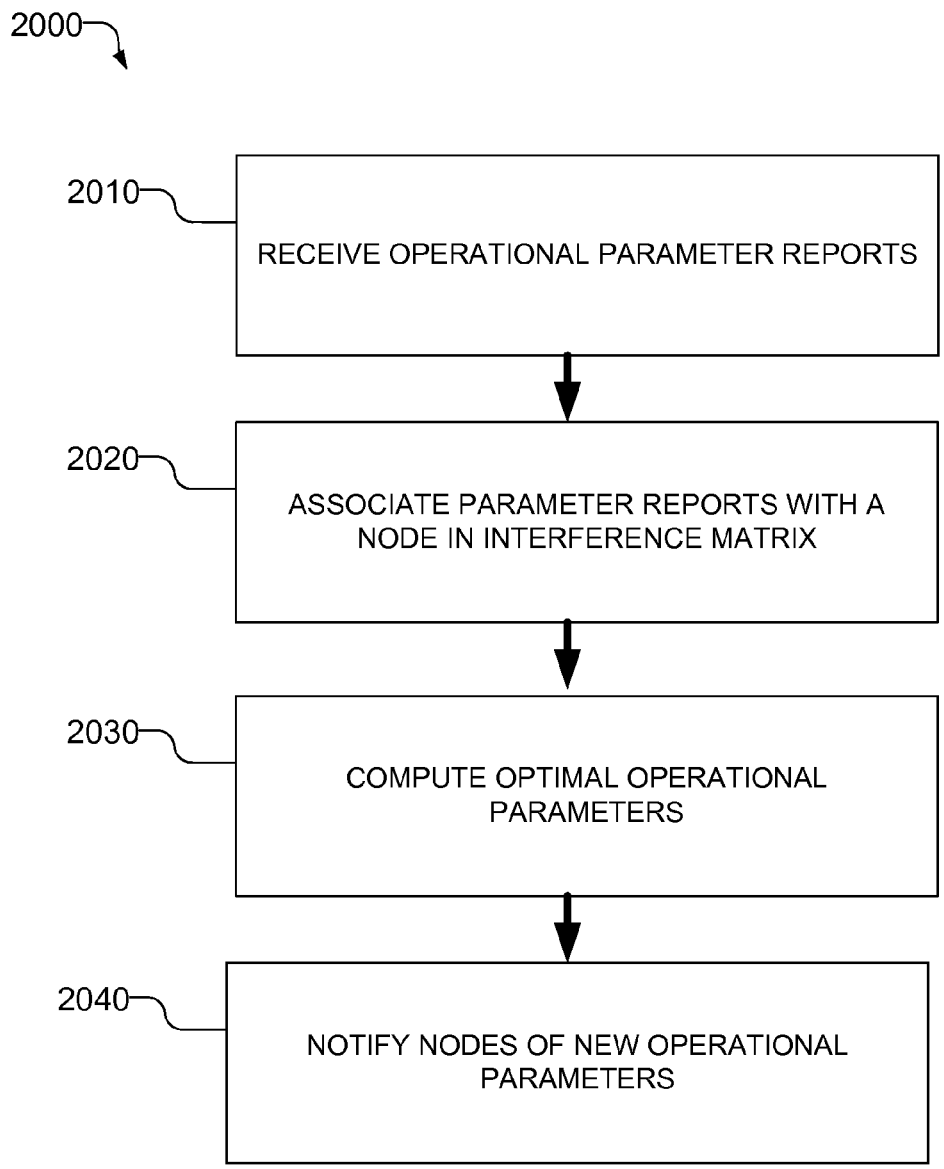
FIG. 2 shows a flowchart of a method according to some examples of the present disclosure.

Turning now to FIG. 2, a method 2000 of operating a coordination node is shown. At operation 2010 the coordination node receives operational parameter reports from a number of WiFi Direct devices. The WiFi Direct devices may send the reports according to a predetermined time period (e.g., at a certain time of the day), with a certain periodicity (e.g., every hour, half-hour, or the like), or at a time chosen by the coordinator node and signaled to the WiFi Direct devices (e.g., immediately, in five minutes, in ten minutes). In the examples in which the time at which the reports are sent is chosen by the coordinator node, the coordinator node may choose to schedule the WiFi Direct devices. In some examples, the reports may be scheduled such that each participating device sends their report at a different time, or in groups, so as to avoid overloading the manageability network 1060 or the coordinator node 1050. This may prevent overload of the coordinator node and/or the manageability network.

Once the reports are received, each report may be associated with a particular device or WiFi Direct communication session based on information such as the frequency reported, other operating parameters, global positioning information, the return address of the report, or the like at operation 2020. Additionally, each measurement report may contain operational parameters of other WiFi Direct communication sessions as observed from the sending WiFi Direct node. For example, the notebook 1014 in FIG. 1 may send information on observed frequencies, interference levels, or the like regarding the communication session 1020, 1030, 1040, and/or 1070. These reports may also be correlated to the particular WiFi Direct communication sessions based on the frequency reported, or other operational parameters. A particular communication session may be identified by its operational parameters (e.g., frequency) and/or its return address. Thus if communication session 1010 from FIG. 1 identifies itself as operating in frequency X and communication session 1020 sends a report on operational parameters from a scanned neighbor communication session that is operating on frequency X, the coordinator node may correlate that measurement with communication session 1020. If the neighboring communication session reported on has not previously identified itself to the coordination node, it is possible that it will in the future or that it is not participating in the coordination. Either way, the data on this neighboring communication session may still be used to refine the operating parameters of the communication sessions who are participating to avoid interference from the non-participating neighbor.

At operation 2030, the data may be used to compute optimal operational parameters. In some examples, the data may be stored in an interference matrix and an automatic frequency planner may be used to optimally compute the frequencies of the communication sessions based on the interference matrix. Once the optimal operational parameters are computed, the nodes may then be notified at operation 2040 of any new operational parameters by the coordinator node through messages sent on the out-of-band manageability network. These messages may be sent using any suitable protocol.

Figure 3:
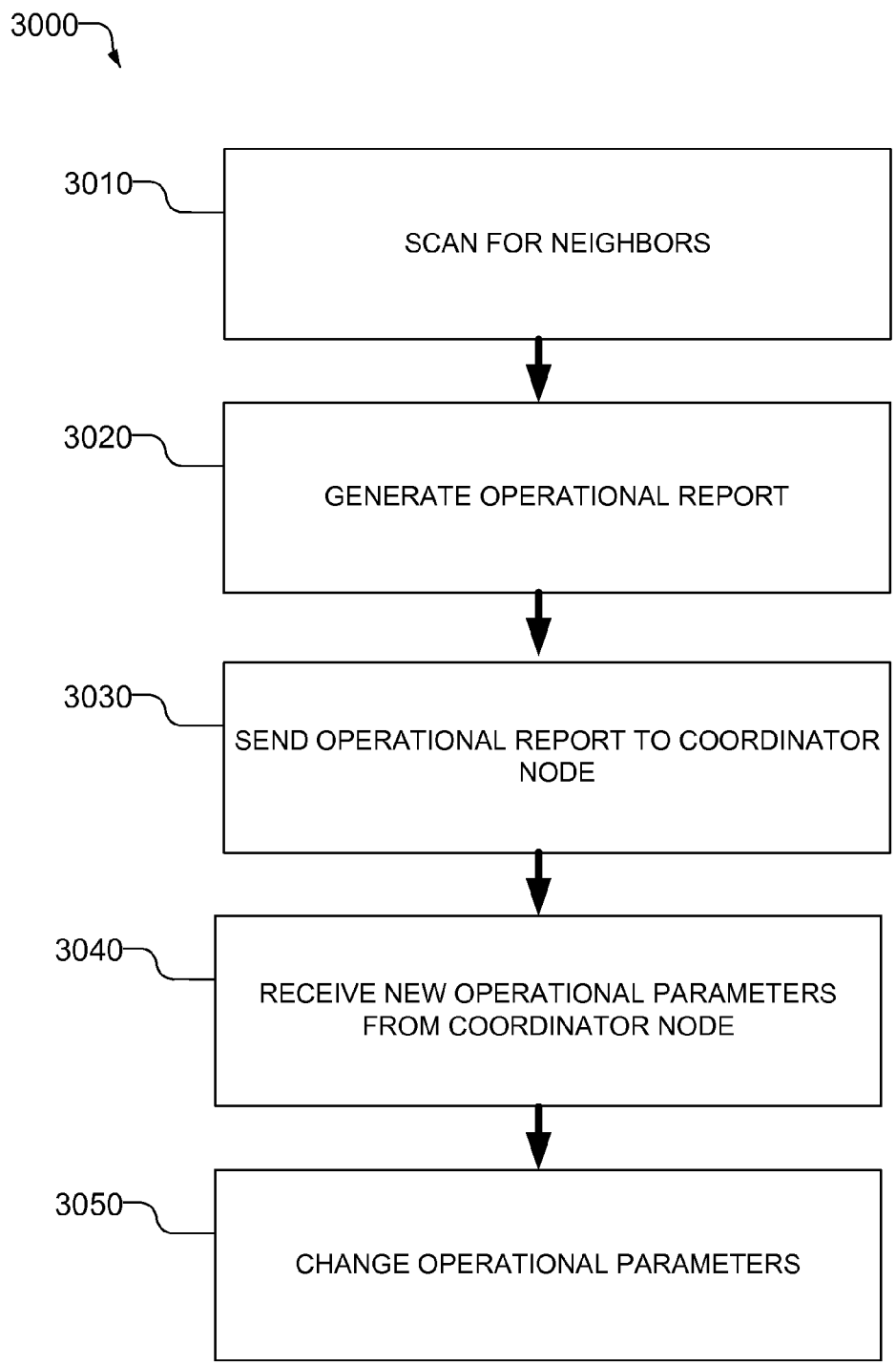
FIG. 3 shows a flowchart of a method according to some examples of the present disclosure.

FIG. 3 shows a method 3000 of operating a WiFi Direct device according to some examples. At operation 3010, the device may scan for, and collect neighbor information. The neighbor information may include the frequency the neighbor is operating, the interference generated by the neighbor, or the like. The neighbors may be participating in WiFi Direct communication sessions of their own, may be communicating with a traditional access point with a traditional WiFi communication session, or may be participating in some other communication session utilizing some other connection protocol. At operation 3020, the device may generate an operational report based on this neighbor information and the operational parameters of the communication session that the WiFi Direct device is currently associated with. At operation 3030 the operational report may be sent to the coordinator node through the out-of-band manageability network. Once the coordinator node makes the appropriate decisions coordinating the WiFi Direct devices, the coordinator node may send new operational parameters to the WiFi Direct communication sessions. At operation 3040, upon receipt of new operational parameters, the WiFi Direct devices may change those operational parameters at operation 3050.

Figure 4:
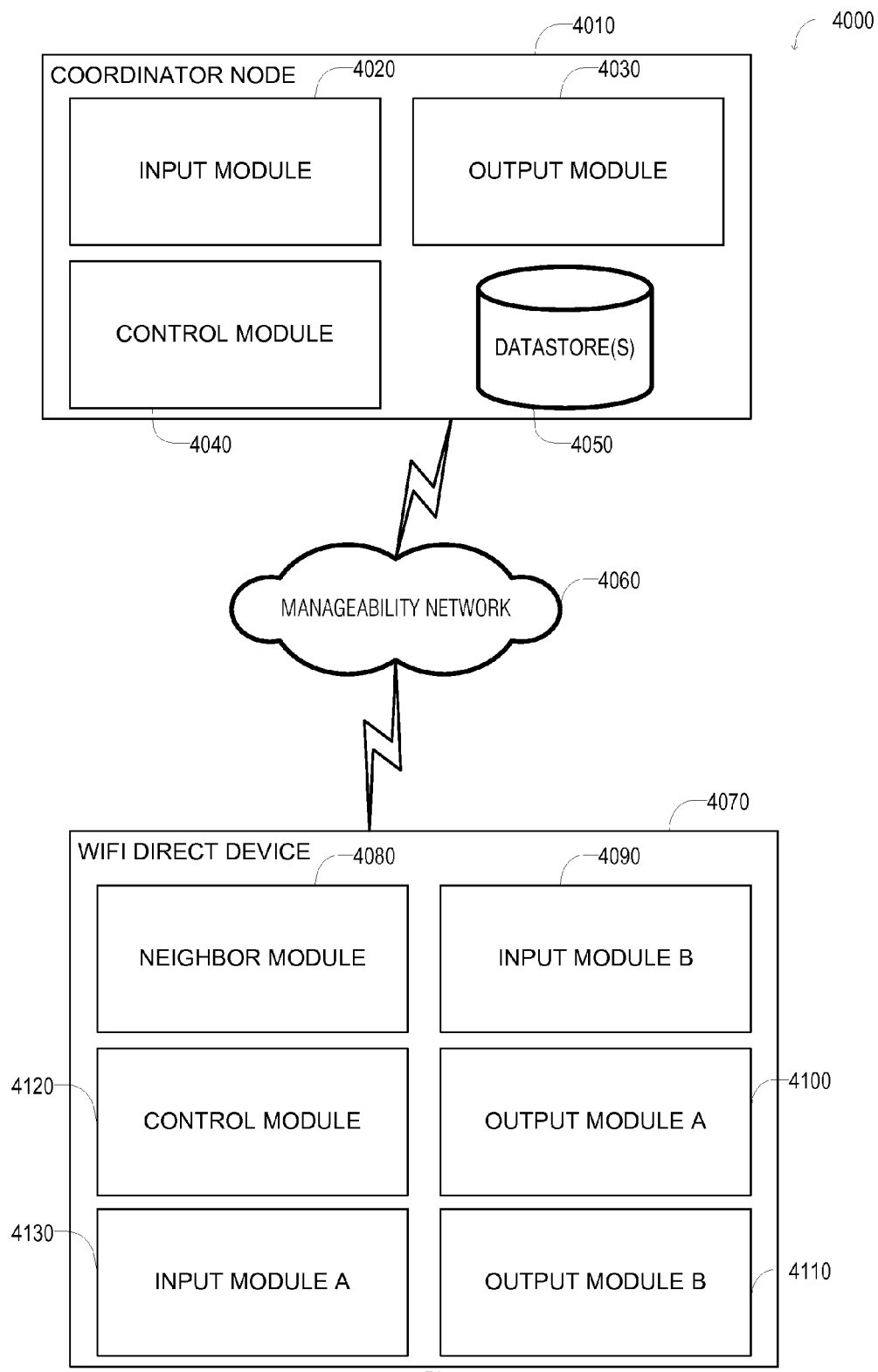
FIG. 4 shows a schematic of a system according to some examples of the present disclosure.

Turning now to FIG. 4, a schematic of a system 4000 according to some examples is shown. System 4000 may include a coordinator node 4010 and one or more WIFI Direct devices 4070. In some examples, coordinator node 4010 may be coordinator node 1050 from FIG. 1. In some examples, WiFi Direct device 4070 may be WiFi Direct device 1012, 1014, 1022, 1024, 1032, 1034, 1036, 1042, or 1044 from FIG. 1. In some examples the WIFI Direct Device 4070 may serve as a coordinator node 4010. Coordinator node 4010 may include an input module 4020. Input module 4020 may receive input over manageability network 4060 from the various WIFI Direct Devices 4070 in the form of operational parameter reports which report the operational parameters of the WIFI Direct Device and in some examples, one or more neighbors that it is able to detect. The Input module 4020 may then pass these reports onto the control module 4040. Control module 4040 may associate the operational reports and the neighbor reports with each particular node to which it applies and store it in datastore 4050.

Upon collecting a sufficient amount of reports, expiration of a timer, or some other suitable trigger, the control module 4040 may calculate a new set of operational parameters for each node that it is associated with. The coordinator node may be considered as "associated" with a particular node when it receives an operational report from a particular node. The coordinator node may be aware of, and take into account, nodes which are not associated with the coordinator node (e.g., neighbors reported by a device associated with the coordinator node that are not associated with the coordinator node). This may allow unassociated nodes to be considered in the operating parameter optimization algorithms so as to optimize the associated nodes to avoid interference from, and avoid interfering with the unassociated neighbors.

These new operational parameters may be sent to each associated device by the output module 4030 over the manageability network. In some examples, the new operational parameters may be stored in datastore 4050.

Manageability network 4060 is a different network than the network which connects the WiFi Direct device 4070 and any other WiFi Direct devices to which it is associated with in a WiFi Direct connection. In some examples, the Manageability network 4060 may be a WiFi network (e.g., a traditional access point or ad hoc network as opposed to a WiFi Direct network), a cellular network, a wired network, or the like.

WiFi direct device 4070 may include input module A 4130 and output module A 4100 which may send and receive communications over a WiFi direct connection to other WiFi Direct Devices 4070 (input module A 4130 and output module A 4100 may be collectively referred to as a WiFi direct module). Input module B 4090 may receive operational parameters from the coordinator node 4010, and output module B 4110 may send operational parameter reports to the coordinator node through manageability network 4060. Neighbor module 4080 may scan for neighboring devices utilizing the WiFi Direct frequencies and may determine the operational characteristics of those devices and a level of interference those devices are causing to the operation of input and output modules 4130 and 4100. These measurements may be used to create the operational reports sent to the coordinator node 4010 which may be used by the coordinator node to create the optimal operational parameters.

Control module 4120 coordinates the transmission and reception of data through input and output modules 4090, 4100, 4110, and 4130. Control module 4120 may include functionality for operating a Soft AP and may coordinate the gathering of the neighbor information and the generation of the operational reports as well as the processing of any operational parameter adjustments sent by the coordinator node 4010. In some examples in which a WiFi Direct Device (e.g., such as a WiFi Direct Device 4070) serves as a Coordinator Node 4010, the control module 4120 may participate and contain logic for the selection of the coordinator node 4010 from the WiFi Direct Devices. In examples in which the WiFi Direct Device 4070 also serves as the coordinator node 4010, the functions described for the coordinator node 4010 may be performed by one or more of the modules described with respect to WiFi Direct Device 4070 or additional modules. The WiFI Direct Device 4070 may also contain one or more datastore(s) 4050 to store the various operational parameters.

While the examples described herein primarily focused on WiFi Direct nodes coordinating with a coordinator node, in other examples, devices communicating using traditional (non WiFi Direct) WiFi communication sessions, or communicating through other wireless protocols may participate in the coordination as well by reporting their operating parameters and their observations about neighboring devices. Additionally, while the examples above discussed devices reporting information on other WiFi Direct neighbors, other examples include the devices reporting observed parameters of any other device which utilizes frequencies close to the useable frequencies of the reporting device regardless of the protocol used (e.g., regular Access Point based WiFi, WiFi Direct, cellular, Bluetooth, cordless telephones, or the like).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
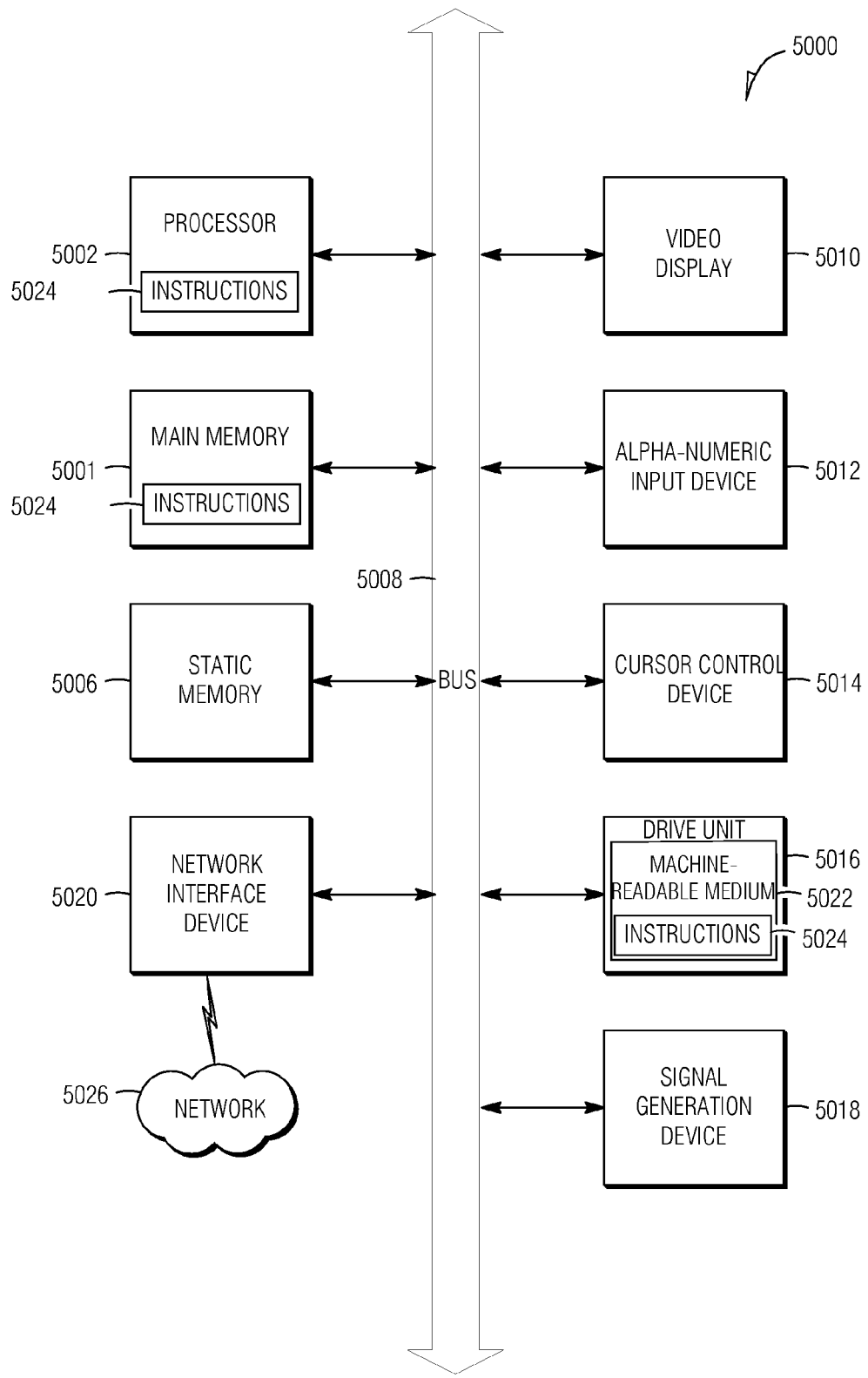
FIG. 5 shows a schematic of a machine according to some examples of the present disclosure.

FIG. 5 is a block diagram of machine in the example form of a computer system 5000 within which instructions, for causing the machine to perform any one or more of the methodologies discussed herein, may be executed. For example, the various WiFi Direct devices and/or the coordinator node may be or contain one or more of the components described in FIG. 5. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 5 or only a subset of the components shown in FIG. 5.

The example computer system 5000 includes a processor 5002 (e.g., a central processing unit (CPU), a graphics processing unit (GPU) or both), a main memory 5004 and a static memory 5006, which communicate with each other via a bus 5008. The computer system 5000 may further include a video display unit 5010 (e.g., a liquid crystal display (LCD) or a cathode ray tube (CRT)). The computer system 5000 also includes an alphanumeric input device 5012 (e.g., a keyboard), a user interface (UI) navigation device 5014 (e.g., a mouse), a disk drive unit 5016, a signal generation device 5018 (e.g., a speaker) and a network interface device 5020.

Machine-Readable Medium

The disk drive unit 5016 includes a machine-readable medium 5022 on which is stored one or more sets of instructions and data structures (e.g., software) 5024 embodying or used by any one or more of the methodologies or functions described herein. The instructions 5024 may also reside, completely or at least partially, within the main memory 5004, static memory 5006, and/or within the processor 5002 during execution thereof by the computer system 5000, the main memory 5004 and the processor 5002 also constituting machine-readable media.

While the machine-readable medium 5022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 5024 may further be transmitted or received over a communications network 5026 using a transmission medium. The instructions 5024 may be transmitted using the network interface device 5020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 5020 may wirelessly transmit data and may include an antenna.

OTHER NOTES AND EXAMPLES

Example 1

A method comprising receiving at a coordinator node a plurality of operational reports from a plurality of devices, each device engaging in a WiFi Direct communication session, the operational reports identifying a first communication parameter used for the WiFi Direct wireless communication session and a second communication parameter observed of a neighboring communication session; calculating one or more optimal communication parameters for one or more of the plurality of devices using the first and second communication parameters from the plurality of operational reports; and sending to the one or more of the plurality of devices the calculated one or more optimal communication parameters, wherein the plurality of operational reports are received and the optimal communication parameters are sent over a network out-of-band from the WiFi Direct communication sessions.

Example 2

The method of example 1, wherein the plurality of devices are connected to the coordinator node through a wired connection.

Example 3

The method of example 1, wherein the plurality of devices are connected to the coordinator node through a wireless connection separate from the WiFi Direct connection.

Example 4

The method of any one of examples 1-3, wherein calculating the one or more optimal communication parameters comprises using an interference matrix.

Example 5

The method of example 4, wherein calculating the one or more optimal communication parameters comprises applying an automatic frequency planner.

Example 6

The method of any one of examples 1-5, wherein the communication parameter is a frequency, and the optimal communication parameters are frequencies.

Example 7

A coordinator node comprising: an input module configured to receive a plurality of operational reports from a plurality of devices, each device engaging in a WiFi Direct communication session, the operational reports identifying a first communication parameter used for the WiFi Direct wireless communication session and a second communication parameter observed of a neighboring communication session; a control module operating on a computer processor and configured to calculate one or more optimal communication parameters for one or more of the plurality of devices using the first and second communication parameters from the plurality of operational reports; and an output module configured to send to the one or more of the plurality of devices the calculated one or more optimal communication parameters, wherein the plurality of operational reports are received and the optimal communication parameters are sent over a network out-of-band from the WiFi Direct communication sessions.

Example 8

The coordinator node of example 7, wherein the plurality of devices are connected to the coordinator node through a wired connection.

Example 9

The coordinator node of example 7, wherein the plurality of devices are connected to the coordinator node through a wireless connection separate from the WiFi Direct connection.

Example 10

The coordinator node of any one of examples 7-9, wherein calculating the one or more optimal communication parameters comprises using an interference matrix.

Example 11

The coordinator node of example 10, wherein calculating the one or more optimal communication parameters comprises applying an automatic frequency planner.

Example 12

The coordinator node of any one of examples 7-11, wherein the communication parameter is a frequency, and the optimal communication parameters are frequencies.

Example 13

A machine-readable medium that stores instructions which when performed by a machine, cause the machine to perform operations comprising: receiving at a coordinator node a plurality of operational reports from a plurality of devices, each device engaging in a WiFi Direct communication session, the operational reports identifying a first communication parameter used for the WiFi Direct wireless communication session and a second communication parameter observed of a neighboring communication session; calculating one or more optimal communication parameters for one or more of the plurality of devices using the first and second communication parameters from the plurality of operational reports; and sending to the one or more of the plurality of devices the calculated one or more optimal communication parameters, wherein the plurality of operational reports are received and the optimal communication parameters are sent over a network out-of-band from the WiFi Direct communication sessions.

Example 14

The machine-readable medium of example 13, wherein the plurality of devices are connected to the coordinator node through a wired connection.

Example 15

The machine-readable medium of example 13, wherein the plurality of devices are connected to the coordinator node through a wireless connection separate from the WiFi Direct connection.

Example 16

The machine-readable medium of any one of examples 13-15, wherein calculating the one or more optimal communication parameters comprises using an interference matrix.

Example 17

The machine-readable medium of example 16, wherein calculating the one or more optimal communication parameters comprises applying an automatic frequency planner.

Example 18

The machine-readable medium of any one of examples 13-17, wherein the communication parameter is a frequency, and the optimal communication parameters are frequencies.

Example 19

A method comprising: at a computing device, initiating a WiFi Direct communication session with another device; scanning for neighboring WiFi Direct communication sessions; preparing an operational report comprising operational parameters of the neighboring WiFi Direct communication sessions and operational parameters of the WiFi Direct communication session with the another device; sending the operational report to a coordinator node; receiving an optimal communication parameter from the coordinator node, the optimal communication parameters based on the operational report; and modifying the WiFi Direct connection according to the optimal communication parameter sent from the coordinator node, wherein the operational report is sent, and the optimal communication parameter are received over an out-of-band network connection.

Example 20

The method of example 19, wherein the optimal communication parameter includes an optimal frequency.

Example 21

The method of any one of examples 19-20, wherein the computing device is a notebook computer and the another device is a notebook docking station.

Example 22

The method of any one of examples 19-21, wherein the device is connected to the out-of-band network through a wired connection.

Example 23

The method of any one of examples 19-21, wherein the device is connected to the out-of-band network through a wireless connection.

Example 24

The method of any one of examples 19-23, comprising executing a soft access point at the computing device to host the WiFi Direct communication session.

Example 25

A computing device comprising: a WiFi Direct module configured to initiate a WiFi Direct communication session with another device; a neighbor module configured to scan for neighboring WiFi Direct communication sessions; a control module configured to prepare an operational report comprising operational parameters of the neighboring WiFi Direct communication sessions and operational parameters of the WiFi Direct communication session with the another device; an output module configured to send the operational report to a coordinator node; an input module configured to receive an optimal communication parameter from the coordinator node, the optimal communication parameters based on the operational report; and wherein the control module is further configured to modify the WiFi Direct connection according to the optimal communication parameter sent from the coordinator node, wherein the operational report is sent, and the optimal communication parameter are received over an out-of-band network connection.

Example 26

The computing device of example 25, wherein the optimal communication parameter includes an optimal frequency.

Example 27

The computing device of any one of examples 25-26, wherein the computing device is a notebook computer and the another device is a notebook docking station.

Example 28

The computing device of any one of examples 25-27, wherein the device is connected to the out-of-band network through a wired connection.

Example 29

The computing device of any one of examples 25-27, wherein the device is connected to the out-of-band network through a wireless connection.

Example 30

The computing device of any one of examples 25-29, wherein the WiFi Direct module is further configured to execute a soft access point at the computing device to host the WiFi Direct communication session.

Example 31

A machine readable medium that stores instructions which when performed by a machine, cause the machine to perform operations comprising: at a computing device, initiating a WiFi Direct communication session with another device; scanning for neighboring WiFi Direct communication sessions; preparing an operational report comprising operational parameters of the neighboring WiFi Direct communication sessions and operational parameters of the WiFi Direct communication session with the another device; sending the operational report to a coordinator node; receiving an optimal communication parameter from the coordinator node, the optimal communication parameters based on the operational report; and modifying the WiFi Direct connection according to the optimal communication parameter sent from the coordinator node, wherein the operational report is sent, and the optimal communication parameter are received over an out-of-band network connection.

Example 32

The machine-readable medium of example 31, wherein the optimal communication parameter includes an optimal frequency.

Example 33

The machine-readable medium of any one of examples 31-32, wherein the computing device is a notebook computer and the another device is a notebook docking station.

Example 34

The machine-readable medium of any one of examples 31-33, wherein the device is connected to the out-of-band network through a wired connection.

Example 35

The machine-readable medium of any one of examples 31-33, wherein the device is connected to the out-of-band network through a wireless connection.

Example 36

The machine-readable medium of any one of examples 31-35, comprising executing a soft access point at the computing device to host the WiFi Direct communication session.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   establishing a WiFi Direct communication session between a coordinator node and at least one of a plurality of devices;
   measuring a plurality of communication parameters used for the WiFi Direct communication session by the coordinator node;
   receiving at the coordinator node a plurality of operational reports from the plurality of devices, each device of the plurality of devices engaging in a WiFi Direct communication session, the operational reports identifying a first communication parameter used for the WiFi Direct wireless communication session and a second communication parameter observed of a neighboring communication session;
   calculating one or more optimal communication parameters for one or more of the plurality of devices using the first and second communication parameters from the plurality of operational reports and the plurality of communication parameters measured by the coordinator node; and
   sending to the one or more of the plurality of devices the calculated one or more optimal communication parameters, wherein the plurality of operational reports are received and the optimal communication parameters are sent over a network out-of-band from the WiFi Direct communication sessions.

2. The method of claim 1, wherein at least one of the plurality of devices are connected to the coordinator node through a wired connection.

3. The method of claim 1, wherein at least one of the plurality of devices are connected to the coordinator node through a wireless connection separate from the WiFi Direct connection.

4. The method of claim 1, wherein calculating the one or more optimal communication parameters comprises using an interference matrix.

5. The method of claim 4, wherein calculating the one or more optimal communication parameters comprises applying an automatic frequency planner.

6. The method of claim 1, wherein the communication parameter is a frequency, and the optimal communication parameters are frequencies.

7. A coordinator node comprising:
a control module operating on a computer processor and configured to establish a WiFi Direct communication session between the coordinator node and at least one of a plurality of devices;
an input module configured to receive a plurality of operational reports from the plurality of devices, each device of the plurality of devices engaging in the WiFi Direct communication session, the operational reports identifying a first communication parameter used for the WiFi Direct wireless communication session and a second communication parameter observed of a neighboring communication session;
wherein the control module is further configured to measure a plurality of communication parameters used for the WiFi Direct communication session and calculate one or more optimal communication parameters for one or more of the plurality of devices using the first and second communication parameters from the plurality of operational reports and the plurality of communication parameters measured; and
an output module configured to send to the one or more of the plurality of devices the calculated one or more optimal communication parameters, wherein the plurality of operational reports are received and the optimal communication parameters are sent over a network out-of-band from the WiFi Direct communication sessions.

8. The coordinator node of claim 7, wherein at least one of the plurality of devices are connected to the coordinator node through a wired connection.

9. The coordinator node of claim 7, wherein at least one of the plurality of devices are connected to the coordinator node through a wireless connection separate from the WiFi Direct connection.

10. The coordinator node of claim 7, wherein calculating the one or more optimal communication parameters comprises using an interference matrix.

11. The coordinator node of claim 10, wherein calculating the one or more optimal communication parameters comprises applying an automatic frequency planner.

12. The coordinator node of claim 7, wherein the communication parameter is a frequency, and the optimal communication parameters are frequencies.

13. A non-transitory machine-readable medium that stores instructions which when performed by a machine, cause the machine to perform operations comprising:
establishing a WiFi Direct communication session between a coordinator node and at least one of a plurality of devices;
measuring a plurality of communication parameters used for the WiFi Direct communication session by the coordinator node;
receiving at the coordinator node a plurality of operational reports from the plurality of devices, each device of the plurality of devices engaging in a WiFi Direct communication session, the operational reports identifying a first communication parameter used for the WiFi Direct wireless communication session and a second communication parameter observed of a neighboring communication session;
calculating one or more optimal communication parameters for one or more of the plurality of devices using the first and second communication parameters from the plurality of operational reports and the plurality of communication parameters measured by the coordinator node; and
sending to the one or more of the plurality of devices the calculated one or more optimal communication parameters, wherein the plurality of operational reports are received and the optimal communication parameters are sent over a network out-of-band from the WiFi Direct communication sessions.

14. The machine-readable medium of claim 13, wherein at least one of the plurality of devices are connected to the coordinator node through a wired connection.

15. The machine-readable medium of claim 13, wherein at least one of the plurality of devices are connected to the coordinator node through a wireless connection separate from the WiFi Direct connection.

16. The machine-readable medium of claim 13, wherein calculating the one or more optimal communication parameters comprises using an interference matrix.

17. The machine-readable medium of claim 16, wherein calculating the one or more optimal communication parameters comprises applying an automatic frequency planner.

18. The machine-readable medium of claim 13, wherein the communication parameter is a frequency, and the optimal communication parameters are frequencies.

19. A method comprising:
at a computing device, initiating a WiFi Direct communication session with another device, wherein the another device is a coordinator node;
scanning for neighboring WiFi Direct communication sessions;
preparing an operational report comprising operational parameters of the neighboring WiFi Direct communication sessions and operational parameters of the WiFi Direct communication session with the another device;
sending the operational report to the another device;
receiving an optimal communication parameter from the another device, the optimal communication parameters based on the operational report; and
modifying the WiFi Direct connection according to the optimal communication parameter sent from the another device, wherein the operational report is sent, and the optimal communication parameter are received over an out-of-band network connection.

20. The method of claim 19, wherein the optimal communication parameter includes an optimal frequency.

21. The method of claim 19, wherein the computing device is a notebook computer and the another device is a notebook docking station.

22. The method of claim 19, wherein the device is connected to the out-of-band network through a wired connection.

23. The method of claim 19, wherein the device is connected to the out-of-band network through a wireless connection.

24. The method of claim 19, comprising executing a soft access point at the computing device to host the WiFi Direct communication session.

25. A computing device comprising:
a control module configured to initiate a WiFi Direct communication session with another device, wherein the another device is a coordinator node;
a neighbor module configured to scan for neighboring WiFi Direct communication sessions;
a control module configured to prepare an operational report comprising operational parameters of the neighboring WiFi Direct communication sessions and operational parameters of the WiFi Direct communication session with the another device;

an output module configured to send the operational report to the another device;

an input module configured to receive an optimal communication parameter from the another device, the optimal communication parameters based on the operational report; and wherein the control module is further configured to modify the WiFi Direct connection according to the optimal communication parameter sent from the another device, wherein the operational report is sent, and the optimal communication parameter are received over an out-of-band network connection.

26. The computing device of claim 25, wherein the optimal communication parameter includes an optimal frequency.

27. The computing device of claim 25, wherein the computing device is a notebook computer and the another device is a notebook docking station.

28. The computing device of claim 25, wherein the device is connected to the out-of-band network through a wired connection.

29. The computing device of claim 25, wherein the device is connected to the out-of-band network through a wireless connection.

30. The computing device of claim 25, wherein the control module is further configured to execute a soft access point at the computing device to host the WiFi Direct communication session.

31. A non-transitory machine readable medium that stores instructions which when performed by a machine, cause the machine to perform operations comprising:

at a computing device, initiating a WiFi Direct communication session with another device, wherein the another device is a coordinator node;

scanning for neighboring WiFi Direct communication sessions;

preparing an operational report comprising operational parameters of the neighboring WiFi Direct communication sessions and operational parameters of the WiFi Direct communication session with the another device;

sending the operational report to the another device;

receiving an optimal communication parameter from the another device, the optimal communication parameters based on the operational report;

modifying the WiFi Direct connection according to the optimal communication parameter sent from the another device, wherein the operational report is sent, and the optimal communication parameter are received over an out-of-band network connection.

32. The machine-readable medium of claim 31, wherein the optimal communication parameter includes an optimal frequency.

33. The machine-readable medium of claim 31, wherein the computing device is a notebook computer and the another device is a notebook docking station.

34. The machine-readable medium of claim 31, wherein the device is connected to the out-of-band network through a wired connection.

35. The machine-readable medium of claim 31, wherein the device is connected to the out-of-band network through a wireless connection.

36. The machine-readable medium of claim 31, comprising executing a soft access point at the computing device to host the WiFi Direct communication session.

37. A computing device comprising:

a control module configured to initiate a WiFi Direct communication session with another device, wherein the another device is a coordinator node;

a neighbor module configured to scan for neighboring WiFi Direct communication sessions;

wherein the control module is further configured to prepare an operational report comprising operational parameters of the neighboring WiFi Direct communication sessions and operational parameters of the WiFi Direct communication session with the another device;

an output module configured to send the operational report to the another device;

an input module configured to receive an optimal communication parameter from the another device, the optimal communication parameters based on the operational report;

a user interface navigation device configured to receive user input; and wherein the control module is further configured to modify the WiFi Direct connection according to the optimal communication parameter sent from the another device, wherein the operational report is sent, and the optimal communication parameter are received over an out-of-band network connection.

* * * * *